United States Patent
Wang et al.

(10) Patent No.: US 12,510,152 B2
(45) Date of Patent: Dec. 30, 2025

(54) METHOD FOR CALIBRATING A PIVOT ANGLE SENSOR, CONTROL MEANS, AND PROPULSION OR WORKING MACHINE

(71) Applicant: Robert Bosch GmbH, Stuttgart (DE)

(72) Inventors: Ximing Wang, Neu-Ulm (DE); Marcel Golde, Laupheim (DE); Michael Brand, Ulm (DE); Salih Tetik, Nersingen (DE); Daniel Geiger, Ulm (DE); Benedikt Schrodi, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 416 days.

(21) Appl. No.: 18/005,999

(22) PCT Filed: Jul. 14, 2021

(86) PCT No.: PCT/EP2021/069572
§ 371 (c)(1),
(2) Date: Jan. 19, 2023

(87) PCT Pub. No.: WO2022/017881
PCT Pub. Date: Jan. 27, 2022

(65) Prior Publication Data
US 2023/0296171 A1 Sep. 21, 2023

(30) Foreign Application Priority Data
Jul. 21, 2020 (DE) .................. 10 2020 209 160.9

(51) Int. Cl.
*F16H 61/431* (2010.01)
*F16H 59/68* (2006.01)

(52) U.S. Cl.
CPC ... *F16H 61/431* (2013.01); *F16H 2059/6853* (2013.01); *F16H 2342/00* (2013.01)

(58) Field of Classification Search
CPC ............... F16H 61/431; F16H 2342/00; F16H 2059/6853
See application file for complete search history.

(56) References Cited

U.S. PATENT DOCUMENTS

| 7,677,037 | B2 * | 3/2010 | Anderson ............... B60K 6/12 60/418 |
| 2004/0115065 | A1 | 6/2004 | Du et al. |
| 2008/0276607 | A1 | 11/2008 | Anderson et al. |

OTHER PUBLICATIONS

International Search Report corresponding to PCT Application No. PCT/EP2021/069572, mailed Nov. 21, 2021 (German and English language document) (5 pages).

\* cited by examiner

*Primary Examiner* — An H Do
(74) *Attorney, Agent, or Firm* — Maginot, Moore & Beck LLP (57) ABSTRACT

A method is for calibrating a pivot angle sensor of a hydraulic machine of a propulsion or working machine. A control device is configured to operationally control the hydraulic machine. The control device is also configured to process a sensor signal from the pivot angle sensor. The pivot angle sensor is calibrated, preferably in an automated manner, via the control device.

13 Claims, 3 Drawing Sheets

METHOD FOR CALIBRATING A PIVOT ANGLE SENSOR, CONTROL MEANS, AND PROPULSION OR WORKING MACHINE

This application is a 35 U.S.C. § 371 National Stage Application of PCT/EP2021/069572, filed on Jul. 14, 2021, which claims the benefit of priority to Serial No. DE 10 2020 209 160.9, filed on Jul. 21, 2020 in Germany, the disclosures of which are incorporated herein by reference in their entirety.

The disclosure relates to a method for calibrating a pivot angle sensor, a control means, and a hydraulic machine.

BACKGROUND

Pivot angle sensors are used to determine a pivot angle of a hydraulic machine, and in particular an axial piston machine. The pivot angle is determined, for example, so that the hydraulic machine can be controlled via an electrohydraulic hydraulic machine control means. For this purpose, for example, a delivery flow or a delivery volume of the hydraulic machine is captured via the pivot angle, and the pressure at the hydraulic machine output is captured via an attached pressure sensor, for example. Then, for example, the captured actual values of the delivery volume and of the pressure can be compared with target values, and the electrohydraulic hydraulic machine control means can control the hydraulic machine in such a way that the target values can be achieved. In order to reach a precise control of the hydraulic machine, it is necessary to adjust or calibrate the pivot angle sensor, which detects the pivot angle of the hydraulic machine.

A calibration can take place, for example, in the factory during the manufacture of the pivot angle sensor or, for example, at a customer's after installation of the pivot angle sensor in a hydraulic system. For this purpose, end points of the hydraulic machine, i.e., for example, a maximum deflection of the pivot angle or a minimum deflection of the pivot angle, can be controlled on the test bench. Calibration at the customer's means an additional adjustment effort during installation, which results in higher costs. A further disadvantage of manual calibration can be that data must be manually transmitted to the hydraulic machine control means and input so that it can control the hydraulic machine. In addition, it can be disadvantageous that, in the case of a calibration during production, not all add-on units, such as the hydraulic machine control means, have been fitted, and thus the tolerances of the add-on units that have not been fitted are not taken into account during calibration.

SUMMARY

In contrast, the object of the disclosure is to provide a simple and cost-effective method for calibrating a pivot angle sensor of a hydraulic machine. It is a further object of the disclosure to provide a simple and cost-effective control means which executes a simple and cost-effective method for calibrating the pivot angle sensor. Furthermore, it is an object of the disclosure to provide a propulsion or working machine with the control means.

The object as regards the method is achieved according to the features disclosed herein. The object as regards the control means is achieved according to the features disclosed herein, and the object as regards the propulsion or working machine is achieved according to the features disclosed herein.

According to the disclosure, a method for calibrating a pivot angle sensor of a hydraulic machine is provided, wherein the hydraulic machine is arranged in particular in a propulsion or working machine. The hydraulic machine can be driven, for example, via a motor, and in particular a diesel engine, and can, for example, be fluidically connected to at least one consumer and drive it. Furthermore, a control means is provided, via which the hydraulic machine can be controlled-in particular, in terms of operation—i.e., in its intended operation in the propulsion or working machine. In other words, the control means can control the hydraulic machine so that it conveys a desired volume, for example, and/or can provide a desired pressure. Furthermore, the control means processes a sensor signal of the pivot angle sensor. For this purpose, the control means can be connected to the control means, for example, by cable or by a wireless connection, such as Bluetooth, and the control means can receive the sensor signal captured by the pivot angle sensor. The control means is also configured in such a way that a calibration of the pivot angle sensor takes place thereby-in particular, in an automated manner. In other words, the control means can control the hydraulic machine and process the sensor signal captured by the pivot angle in such a way that a calibration of the pivot angle sensor can take place.

Due to the calibration by the control means, via which the hydraulic machine can be controlled—in particular, during operation—both time and costs can be saved upon in comparison with a conventional manual calibration. A calibration by the method can be carried out in the mounted state of the pivot angle sensor on the hydraulic machine and/or on the hydraulic machine in the propulsion or working machine, so that costs during production and during the installation of the propulsion or working machine can be saved upon, since the calibration can be carried out in particular in an automated manner via the control means.

For example, operating points of the hydraulic machine or of the propulsion or working machine need not be approached manually, but can be controlled—in particular, automatically—via the control means such that calibration is simplified. Due to the fact that the calibration can be carried out via the control means, no further software or hardware is required to do so, so that further cost savings are possible. In other words, it is not necessary to undertake further special measures, such as an installation of further hardware or software. A further advantage of the disclosure is that a calibration can be carried out via the control means of the hydraulic machine on a regular basis (in normal operation as intended), e.g., at every start-up of the hydraulic machine and/or at certain time intervals and/or after a certain number of start-ups of the hydraulic machine.

In particular, it is advantageous to carry out calibration permanently via the control means during normal operation. For this reason, aging effects, e.g., aging of seals or sensor drifts, can be taken into account during calibration, and thus a precise control of the hydraulic machine over a long period of time is ensured via the control means without the precision of the control means diminishing over time. Due to the fact that the calibration takes place via the control means, even defects, e.g., in the hydraulic machine and/or the pivot angle sensor, can be detected and diagnosed. For example, increasing contamination of the hydraulic machine and/or of the pivot angle sensor can be detected via changes in the calibration data, and the contamination can additionally be compensated for beforehand via the calibration. In addition, further costs and time can be saved upon by the fact that data from the calibration need not be input into the control means, since the control means performs the calibration, and thus values are available directly in the control means. In contrast, in the prior art, calibration is carried out during assembly, whereby tolerances of the control means are thus not taken into account, e.g., in the case of the voltage signal evaluation of the pivot angle sensor, and thus calibration according to the disclosure via the control means which controls the hydraulic machine can be more precise than a conventional calibration.

In particular, the pivot angle sensor can be calibrated via the control means—in particular, permanently—during normal operation. This means that the control means can calibrate the pivot angle sensor during normal operation of the propulsion or working machine. For example, the control means can calibrate the pivot angle sensor if it detects that the pivot angle of the hydraulic machine is close to or at a defined pivot angle. Additionally or alternatively, the control means can carry out calibration at each start-up of the propulsion or working machine, or at every other start-up of the working machine, or at a certain number of start-ups of the working machine. This is advantageous, since the control means can thus precisely control the pivot angle of the hydraulic machine at any time, and the control means is thus very precise. A different interval from that in which the pivot angle sensor is calibrated is also possible. It is also conceivable that the calibration can take place when requested by an operator of the propulsion or working machine. The calibration can additionally or alternatively also be carried out in a maintenance state of the working machine. In particular, it is advantageous if the calibration is carried out during first-time operation of the working machine or driving machine. This is advantageous because, as a result of the initial calibration, the hydraulic machine can be controlled very much more precisely via the control means, since standard values which are input into the control means, e.g., during production, can differ greatly from actual values.

The calibration is preferably carried out via the control means, when the hydraulic machine is installed in or on the propulsion or working machine as intended. This means that the hydraulic machine is preferably connected hydraulically to consumers or driven units as intended and/or is mechanically connected to a drive unit, e.g., an internal combustion engine or electric motor, which drives the hydraulic machine, and/or the hydraulic machine preferably has one or more signal connection(s)—for example, to one or a respective interface of the working machine. In other words, the hydraulic machine is installed in or mounted on the propulsion or working machine such that the working machine can be operated as intended. This means that a calibration of the pivot angle sensor of the hydraulic machine is preferably carried out in the case of a hydraulic machine that has been mounted as intended. This is advantageous, since a calibration can thus be carried out in the installed state, and this can thus take place at any time. For example, a calibration can take place at every start-up or restart of the working machine, so that a very precise control via the control means is possible. When the working machine is started up, the drive unit of the hydraulic machine is switched on, for example. However, it is also possible for the pivot angle sensor to be calibrated in a state in which it is not mounted on the propulsion or working machine. However, it is advantageous if the pivot angle sensor is arranged on the hydraulic machine and is connected to the control means, and the hydraulic machine can be controlled via the control means.

The control means is preferably a part of the propulsion or working machine. The control means can thus be attached to the propulsion or working machine.

Furthermore, the calibration is preferably carried out via the control means on the basis of characteristic and/or pre-specified and/or intended operating states of the propulsion or working machine—in particular, during the normal or usual operation of the propulsion or working machine. For example, the calibration can take place when the propulsion or working machine is started up, i.e., for example, when the drive unit is switched on. Another possibility would be to carry out the calibration when, for example, maximum power is demanded by the hydraulic machine. In this case, the maximum pivot angle of the hydraulic machine can be approached. Alternatively or additionally, it is possible to carry out the calibration when the working machine is in the non-actuated state. In summary, it is possible for there to be a plurality of intended operating states of the propulsion or working machine, in which the pivot angle sensor can be calibrated via the control means. If the control means detects that the propulsion or working machine is in one of the defined operating states, it can carry out the calibration. It is advantageous to carry out the calibration via the control means on the basis of characteristic and/or pre-specified and/or intended operating states, since, for example, no maintenance state of the propulsion or working machine thus has to be set, and the calibration can thus be carried out without a particular maintenance state of the propulsion or working machine needing to be established. This can save upon time and also costs. Additionally or alternatively, it is possible for a calibration of the pivot angle sensor to be carried out in a maintenance state.

The pivot angle sensor can transmit a pivot-angle-dependent sensor signal to the control means—for example, via the cable and/or via the wireless connection. In particular, the sensor signal is proportional or inversely proportional to the pivot angle of the hydraulic machine. A pivot angle of the hydraulic machine can be assigned via the control means to a respective value of the sensor signal. This means that the control means can form a corresponding value pair from a pivot angle and the respectively associated sensor value of the sensor signal. During calibration, an assignment of pivot angles to sensor values of the sensor signal preferably takes place, so that, for example, a plurality of value pairs are formed, such that the pivot angle can be determined via the sensor signal. In particular, the control means can determine a characteristic curve which can describe the relationship between the sensor value and the pivot angle and contains the value pairs.

During calibration, the control means preferably controls the hydraulic machine in such a way that a state is achieved which is defined by a design-related pivot angle or a design-related pressure or a design-related pressure-medium volume flow of the hydraulic machine. This means that the control means controls the hydraulic machine in such a way that it preferably reaches its maximum pivot angle or its minimum pivot angle. The minimum pivot angle can be defined as the minimum pivot angle of the hydraulic machine or as a pre-specified pivot angle, which can be easily controlled via the control means, and which is smaller than the maximum pivot angle; the minimum pivot angle can be defined, for example, in such a way that, at this angle, the control pressure of the hydraulic machine can be maintained and/or leakage can be compensated for. For example, the minimum pivot angle can be defined such that a pressure when the pump output is closed has a certain value—for example, 20 bar. That is to say, the minimum pivot angle can be defined by means of a design-related pressure or a design-related pressure-medium volume flow, or the minimum pivot angle can be the pivot angle at which the hydraulic machine does not convey pressure medium. In addition, the minimum pivot angle can be predetermined by a mechanical stop. In this exemplary embodiment, the stop can define the minimum delivery volume and the minimum pivot angle. The states described above are defined states which can be easily controlled by the control means and which enable the most precise and accurate calibration of the pivot angle sensor possible.

During calibration, the control means preferably controls one of the states, i.e., preferably at least the design-related pivot angle or the design-related pressure or the design-related pressure-medium volume flow of the hydraulic machine, and the control means assigns the sensor signal's sensor value captured in this state preferably to the pivot angle which was approached or controlled. The control means can preferably carry out the calibration in a characteristic and/or pre-specified and/or intended operating state of the propulsion or working machine. For example, it can control the hydraulic machine in such a way that the hydraulic machine has a state which is defined, for example, by way of the design-related pivot angle or the design-related pressure or pressure-medium volume flow of the hydraulic machine, and the captured sensor value of the sensor signal can then be assigned to this state in order to form a value pair of the characteristic curve, which describes the dependence of the sensor signal on the pivot angle.

If a design-related pressure or a design-related pressure-medium volume flow is controlled by the control means, the pressure or pressure-medium volume flow will be formed such that it preferably compensates for an internal leakage of the hydraulic machine, so that an actuating pressure or control pressure can be maintained such that the hydraulic machine can be controlled. This state can preferably be defined as the minimum pivot angle.

The calibration is preferably carried out in such a way that the control means approaches at least two states, e.g., the maximum pivot angle and the minimum pivot angle of the hydraulic machine, so that at least two value pairs are formed by the control means. Further value pairs can subsequently be interpolated or extrapolated via a calculation rule. For example, the characteristic curve which contains the value pairs can be linear. It is also possible that the characteristic curve which describes the relationship between the pivot angle and the sensor signal not be linear. For example, in this exemplary embodiment, the non-linearity of the sensor signal can be compensated for in order to extrapolate and/or interpolate the characteristic curve. This means that the non-linearity of the characteristic curve is known, and it is thus possible by compensation for the non-linearity to interpolate the characteristic curve between the two value pairs that have been determined. An interpolation or extrapolation is thus particularly easy to carry out. Because two states are controlled by the control means and two value pairs are formed, a calibration can be particularly accurate, since it is known that the characteristic curve is linear. Another possibility is to approach a state, e.g., the maximum pivot angle, and to determine further value pairs via a calculation rule. For example, a reproducible characteristic curve slope is known, which describes the relationship between sensor value and pivot angle. This is advantageous, since only one state needs to be approached during calibration, but errors can occur due to characteristic curve slope tolerances.

During calibration, the control means preferably controls the state, i.e., for example, the maximum or minimum pivot angle over a pre-specified time period. For example, the control means can control the state over a time period of or approximately of 0.125 seconds, and, in this time period, the pivot angle sensor can detect sensor values at, for example, a certain interval—in particular, one value per millisecond. In other words, the control means preferably controls the state over such a time period that the pivot angle sensor can capture a plurality of sensor values in order to determine an averaged sensor value from the plurality of sensor values. The control means can use this averaged sensor value to form a value pair with the state. This is advantageous, since the calibration is thus more precise and more accurate, and measurement errors are averaged out.

Furthermore, the control means preferably checks whether the captured sensor value lies within a pre-specified interval. That is to say, the control means forms the value pair with the captured sensor value only when the sensor value lies within a pre-specified interval. If the sensor value deviates, for example, or deviates markedly, it can be concluded from this that a defect is present—for example, of the hydraulic machine and/or of the pivot angle sensor. This is therefore advantageous, since defects can be easily detected. In addition, the control means is thus prevented from controlling the hydraulic machine incorrectly.

Before calibration, i.e., for example, before a first or initial calibration of the pivot angle sensor, the control means preferably assigns a nominal value to a respective pivot angle. The nominal value can, for example, be a previously determined standard value which can be assigned to a respective pivot angle, so that a control of the hydraulic machine is possible for the control means before calibration.

It is also possible for the characteristic curve or the value pairs from a respective sensor value and a respective pivot angle to be stored, e.g., in a storage medium, so that the pivot angle sensor need not be calibrated at each start-up of the propulsion or working machine. A storage medium can thus be provided. Preferably, the storage medium is arranged in the propulsion or working machine and/or is provided via the internet—for example, via a cloud. Furthermore, it is advantageous if the characteristic curve or the value pairs is/are stored in a or in the storage medium. As a result, the control means can reliably and precisely control the hydraulic machine on the basis of the stored characteristic curve or the stored value pairs.

Should there be a limit on the maximum number of write cycles of the storage medium, it is advantageous if a newly determined characteristic curve or newly captured value pairs is/are stored in the storage medium if they differ significantly from the old characteristic curve. This is advantageous, since the storage medium can thus be used longer. It is thus conceivable as a calibration step to compare a newly determined characteristic curve with the previously applicable characteristic curve and/or to compare newly determined value pairs with the corresponding, previously applicable value pairs.

The calibration via the control means can be carried out in the case of closed-center systems without a flushing valve, in closed-center systems with a flushing valve, and also in closed-center systems and hydraulic machines with a stop for the minimum pivot angle.

The control means preferably controls the hydraulic machine electrohydraulically via an electrically-controlled proportional valve—for example, a pilot valve. An actuating piston of an actuating cylinder, which serves to adjust the pivot angle of the hydraulic machine, can be controlled via the proportional valve, in that the proportional valve connects a pressure line to a control chamber of the actuating cylinder. If actuating pressure or control pressure is not applied to the control chamber, a force will be applied to the actuating piston by a spring force of a spring such that a pivot angle of the hydraulic machine is increased, e.g., to a maximum delivery volume, so that the hydraulic machine conveys volume such that an actuating pressure or control pressure can be achieved. This is also the case when the actuating pressure or control pressure is lower than the spring force.

The sensor value, which can be assigned to the maximum pivot angle, can be captured when the propulsion or working machine is started up. At start-up, no actuating pressure or control pressure is present, so that, due to the spring force of the spring, which applies force to the actuating piston that is designed to adjust the pivot angle, the pivot angle can be at or close to the 100 percent pivot angle. At least, the pivot angle is then such that the hydraulic machine conveys pressure medium. As a result, a control pressure or actuating pressure can be provided, and the control means can control the proportional valve in such a way that the actuating piston completely deflects the hydraulic machine in order to reliably bring the hydraulic machine to the 100 percent pivot angle. Since the hydraulic machine conveys against a closed hydraulic machine outlet, it is advantageous if the period of calibration when capturing the sensor value which can be assigned to the maximum pivot angle is comparatively short—for example, within a range of around zero to ten seconds. The control means processes the sensor signal captured during calibration and captures the sensor value to which the maximum pivot angle can be assigned.

Alternatively, the sensor value, which can be assigned to the maximum pivot angle, can be captured during operation of the propulsion or working machine. The control means can detect when at least one consumer that is fluidically connected to the hydraulic machine is demanding high power, such that the pivot angle is to be set to 100 percent via the control means. If this state is detected by the control means, it can control the actuating piston via the proportional valve in such a way that the pivot angle of the hydraulic machine is reliably deflected to 100 percent, and the sensor value captured in this way can then be assigned to the maximum pivot angle.

In order to capture the sensor value which can be assigned to a minimum pivot angle, i.e., the minimum pivot angle which is approached during operation of the hydraulic machine, an operating state of the propulsion or working machine can be selected in which no power is demanded from the consumer(s) supplied by the hydraulic machine. Furthermore, an operating state of the propulsion or working machine, in which no power is demanded by a consumer or the consumers, can also be selected, in order to control the design-related pressure or the design-related pressure-medium volume flow via which the minimum pivot angle can be defined. This means that the propulsion or working machine can be in the non-actuated state.

In the case of a closed-center system without a flushing valve, when the hydraulic machine is not being controlled by the control means, but a control pressure is applied, the hydraulic machine assumes an equilibrium in which the spring force of the spring which acts on the actuating piston, and the force which acts on the actuating piston by the actuating pressure or control pressure are compensated for. If this state is reached, the sensor value can be captured by the control means and assigned to the minimum pivot angle.

However, this state can be unsuitable for calibration, since the pivot angle and thus the sensor signal can fluctuate when the hydraulic machine is not controlled via the proportional valve. It can therefore be advantageous to define the minimum pivot angle via the state in which a pressure against the closed hydraulic machine outlet is set to a pre-specified value—for example, 20 bar. In order to achieve this state, the control means controls the proportional valve such that the pressure at a closed hydraulic machine outlet reaches the pre-specified value. For this purpose, a pressure sensor can be provided, for example, which determines the pressure at the hydraulic machine outlet. If the pre-specified pressure is reached, the control means captures the sensor value of the sensor signal and assigns it to the minimum pivot angle defined by the state at which the pressure at the hydraulic machine output is pre-specified.

In the case of a closed-center system with a flushing valve, a flushing valve is generally open in the non-actuated state of the machine, e.g., for cooling a valve block or the like, which leads to the state not being achievable in which the pressure against the closed hydraulic machine outlet is a pre-specified pressure. The flushing valve is preferably configured such that it closes as soon as a load pressure builds up. That is to say, as soon as the flushing valve closes, the hydraulic machine can be controlled by the control means via the proportional valve in such a way that the pressure at the closed hydraulic machine outlet is a pre-specified pressure, provided no load is still being demanded by the consumer(s). The sensor value can thus be captured and assigned to the minimum pivot angle, which is defined by the state in which the pressure against the closed hydraulic machine outlet is a pre-specified pressure. Once the value has been captured, the hydraulic machine can be then controlled by the control means in such a way that a function can be performed by the consumer.

In the case of an open-center system, the minimum pivot angle can be adjusted only with difficulty, since the spring on the actuating piston is designed such that the pivot angle of the hydraulic machine is not zero, so that a control pressure can build up such that the hydraulic machine can be controlled. This means that, in the case of an open-center system, the control means controls the hydraulic machine such that, via the actuating piston, it is controlled in the direction of the minimum pivot angle. The actuating pressure or control pressure then decreases, since the hydraulic machine is no longer conveying pressure medium. As a result, the spring force of the spring acts on the actuating piston such that the pivot angle is increased, whereby a pressure medium is once again conveyed. As a result, the control unit can control the hydraulic machine again so that it swings back to the minimum pivot angle and no longer conveys pressure medium. The spring then repeatedly acts in such a way that the pivot angle is increased. This results in a minimum oscillation of the pivot angle around the minimum pivot angle. The associated sensor values can be captured and assigned to the minimum pivot angle. For example, the sensor values can be averaged or smoothed, so that a sensor value that is as precise as possible can be assigned to the minimum pivot value.

In the case of an open-center system with a stop for the minimum pivot angle, this pivot angle is known, and, for this reason, the hydraulic machine can be easily adjusted to this value, and the sensor value thus captured is assigned to the minimum pivot angle, which is known.

Furthermore, the control means is provided for the hydraulic machine of the propulsion or working machine. In addition, a pivot angle sensor is provided, which determines the pivot angle of the hydraulic machine and transmits and communicates a sensor signal to the control means via cable or a wireless connection.

This means that the control means processes the sensor signal of the pivot angle sensor. Furthermore, the hydraulic machine can be controlled via the control means. The control means, which is provided according to the disclosure, is configured such that it can carry out a method for calibrating the pivot angle sensor. The control means is advantageous, since, via said control means, the hydraulic machine, which is installed in or on the propulsion or working machine, for example, as intended, is controllable, and, at the same time, the pivot angle sensor can be calibrated in the mounted state of the hydraulic machine. This means that the calibration can be carried out in the installed or mounted state and does not need to take place during the production of the pivot angle sensor. Furthermore, the calibration is thus possible during operating states of the propulsion or working machine, and this need not be put into a maintenance state, for example.

In addition, the calibration is preferably automated, so that manual start-up of certain states of the hydraulic machine is not necessary.

The pivot angle sensor is preferably designed in two parts. The pivot angle sensor preferably has a magnet and a Hall sensor, wherein one of the two is arranged on a pivot axis of the pivoting cradle of the hydraulic machine, and the other is arranged on a housing of the hydraulic machine. The two parts of the pivot angle sensor are preferably contactless. It is also conceivable for one of the two to be arranged at a different preferred position on the pivoting cradle or pivot disk.

Furthermore, a hydraulic machine is provided with the control means, via which a method for calibrating the pivot angle sensor can be carried out.

A method for calibrating a pivot angle sensor of a hydraulic machine of a propulsion or working machine is disclosed. A control means is provided, via which the hydraulic machine can be controlled in accordance with operation. The control means also processes a sensor signal of the pivot angle sensor. Calibration of the pivot angle sensor is carried out—preferably automatically—via the control means. Furthermore, a control means for calibrating the pivot angle sensor and a propulsion or working machine are provided.

BRIEF DESCRIPTION OF THE DRAWINGS

Preferred exemplary embodiments of the disclosure are explained in more detail below with reference to schematic drawings. In the drawings.

DETAILED DESCRIPTION

Figure 1:
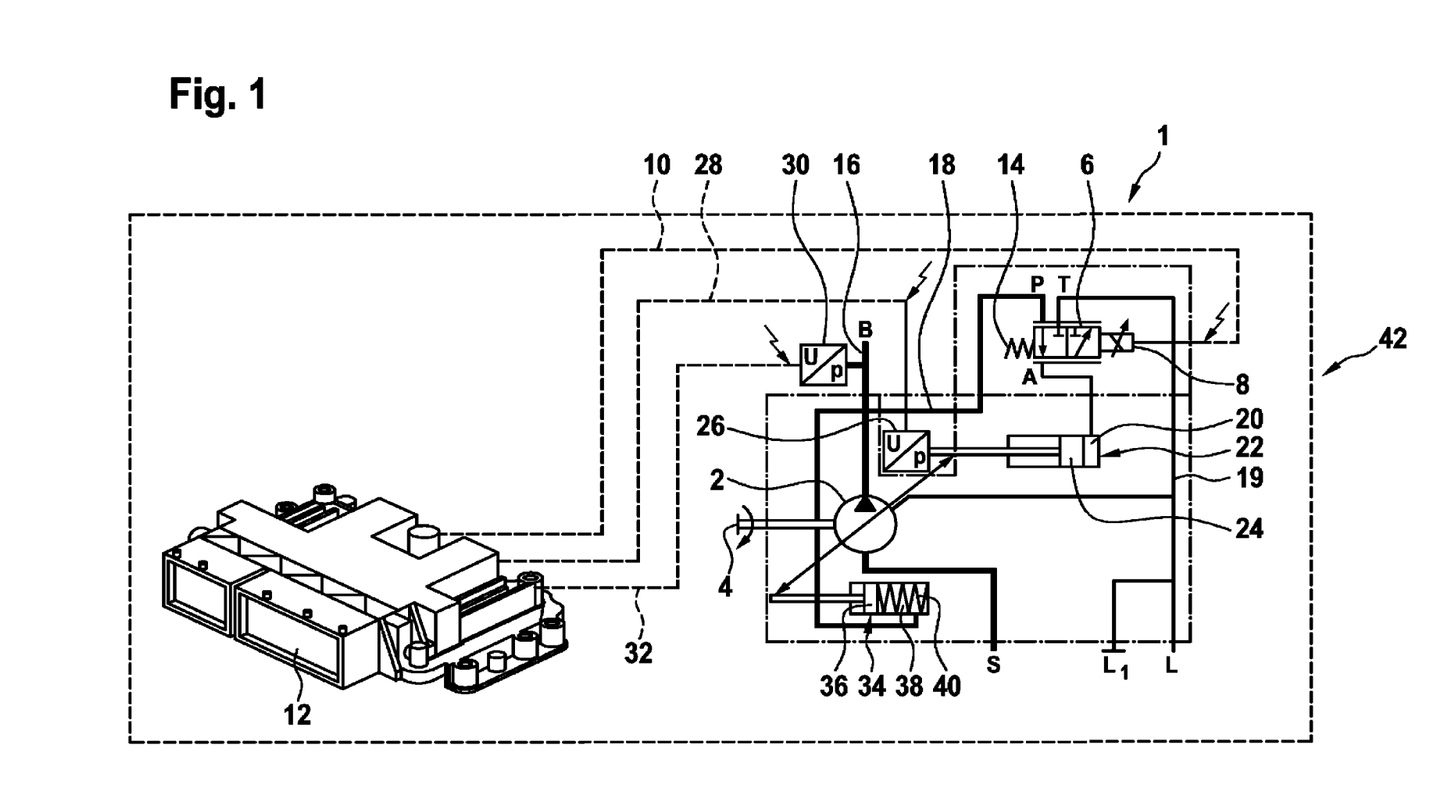
FIG. 1 shows a hydraulic pressure-medium supply arrangement.

FIG. 1 shows a hydraulic pressure-medium supply arrangement 1 which has a hydraulic machine in the form of an axial piston machine 2. This has a pivoting cradle for adjusting a delivery volume. The axial piston machine 2 can be used not only as a pump, but also as a motor. Thus, for example, the pivoting cradle is pivotable. It is also conceivable to design and use the axial piston machine 2 only as a pump. The axial piston machine 2 is driven via a drive shaft 4, which can be driven, for example, by an internal combustion engine, such as a diesel unit. Furthermore, a proportional valve 6 is provided, the valve slide of which can be controlled in an electrically proportional manner via an actuator 8. The proportional valve 6 is provided for controlling the axial piston machine 2. A control variable 10 is fed to the actuator 8 by a control means 12. The valve slide of the proportional valve 6 is acted upon in the direction of a basic position by a spring force of a valve spring 14. The spring force acts counter to the actuator force of the actuator 8.

The axial piston machine 2 is connected on the output side to a pressure line 16.

Via this line, the axial piston machine 2 can be connected, for example, to a main control valve or a valve block. Via the main control valve or the valve block, the pressure-medium supply can be controlled between the axial piston machine 2 and one or more consumers. A control line 18 branches off from the pressure line 16 and is connected to a pressure connector P of the proportional valve 6. Furthermore, the proportional valve 6 has a tank connector T which is connected to a tank via a tank line 19. In addition, the proportional valve 6 has a working connector A, which is connected to a control chamber 20 of an actuating cylinder 22. The control chamber 20 is thereby delimited by an actuating piston 24 of the actuating cylinder 22. The pivoting cradle of the axial piston machine 2 can be adjusted via the actuating piston 24, so that a pivot angle of the axial piston machine 2 can be changed.

Furthermore, the hydraulic pressure-medium supply arrangement 1 has a pivot angle sensor 26. A sensor signal 28 captured by the pivot angle sensor 26 is forwarded to the control means 12. The control means 12 is configured such that, from the captured sensor signal 28, it can determine a pivot angle of the axial piston machine 2. The control means 12 can have stored, for example, a characteristic curve, e.g., in a storage medium, wherein the characteristic curve assigns individual sensor values of the sensor signal to the respective pivot angle in order to form value pairs.

Furthermore, a pressure sensor 30 is provided, which picks up a pressure in the pressure line 16 and reports it to the control means 16, wherein the pressure is an actual output pressure 32.

In the basic position of the valve slide of the proportional valve 6, the pressure connector P is connected to the working connector A, and the tank connector T is shut off. When the actuator force of the actuator 8 is applied to the valve slide, the valve slide, starting from its basic position, is moved in the direction of switching positions in which the pressure connector P is blocked, and the working connector A is connected to the tank connector T. In the basic position of the valve slide of the proportional valve 6, the actuating piston 24 is thus acted upon by pressure medium from the pressure line 16. Furthermore, a cylinder 34 is provided which has an actuating piston 36 that acts on the pivoting cradle of the axial piston machine 2. The actuating piston 36 delimits a control chamber 38 which is connected to the pressure line 16. Via pressure medium of the control chamber 38 and via the spring force of a spring 40, the actuating piston 36 is acted upon in such a way that it loads the pivoting cradle in the direction of an increase in the delivery volume, i.e., an increase in the pivot angle.

During a calibration of the pivot angle sensor 26, i.e., when a sensor value is captured which can be assigned to the minimum or maximum pivot angle, the control means 12 controls the proportional valve 6 via the actuator 8.

For example, during the capture of a sensor value which can be assigned to the minimum pivot angle, the control means can control the proportional valve 6 via the actuator 8 in such a way that the actual output pressure 32, which is measured via the pressure sensor 30, is a pre-specified pressure, e.g., 20 bar, when the pressure line 16 is closed. This means that the valve block or the main control valve with which the pressure line 16 is fluidically connected are blocked.

When the axial piston machine 2 is not rotating, and there is no pressure in the pressure line 16, the pivoting cradle is held by the spring 40 in a position in which a pivot angle can be approximately 100%. For this reason, a calibration, in which a sensor value is captured which can be assigned to the pivot angle, can preferably take place at the start-up of a working machine 42, which comprises the hydraulic pressure-medium supply arrangement 1. In order to ensure that the pivot angle of the axial piston machine 2 is at 100%, the actuator 8 of the proportional valve 6 can be controlled such that the pressure connector P of the proportional valve 6 is not connected to the working connector A. The actuating piston 36 of the cylinder 34 is then subjected to pressure from the pressure line 16 and from the spring force of the spring 40, while the actuating piston 24 is not acted upon by pressure from the pressure line 16. For this reason, the pivoting cradle of the axial piston machine 2 pivots to 100%.

Figure 2A:
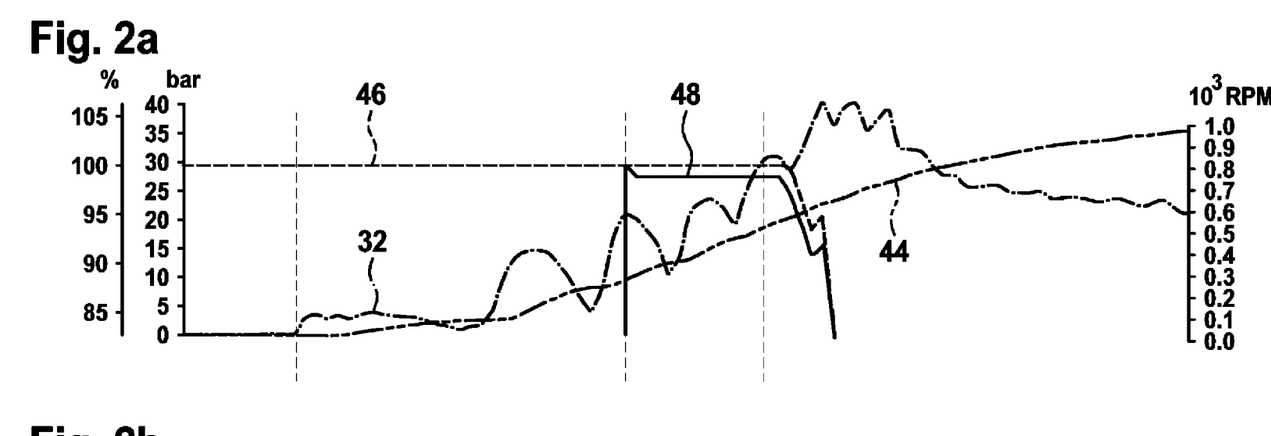
FIG. 2A and FIG. 2B in each case are a diagram showing the course of different measured values during the capture of a sensor value which can be assigned to a maximum pivot angle, and FIG. 3A, FIG. 3B, in each case are a diagram that shows the course of different measured values during the capture of a sensor value which can be assigned to a minimum pivot angle.

FIG. 2a shows a diagram in which measured values captured during calibration, wherein a sensor value is to be captured which can be assigned to the maximum pivot angle, are to be recorded over time. The diagram in FIG. 2a shows a motor speed 44 which corresponds to a rotational speed of the drive shaft 4, which is shown in FIG. 1. Furthermore, the actual output pressure 32 is recorded over time, which, in FIG. 1a, is captured by the pressure sensor 30. Furthermore, a pivot angle 46 of the axial piston machine 2 of FIG. 1 is recorded, wherein the pivot angle 46 is a value which determines the control means 12 of FIG. 1 before calibration of the pivot angle sensor 26 (see FIG. 1) has taken place. Furthermore, a calibrated pivot angle 48 is plotted, wherein this is the pivot angle determined by the control means 12 of FIG. 1 after a calibration has taken place.

Figure 2B:
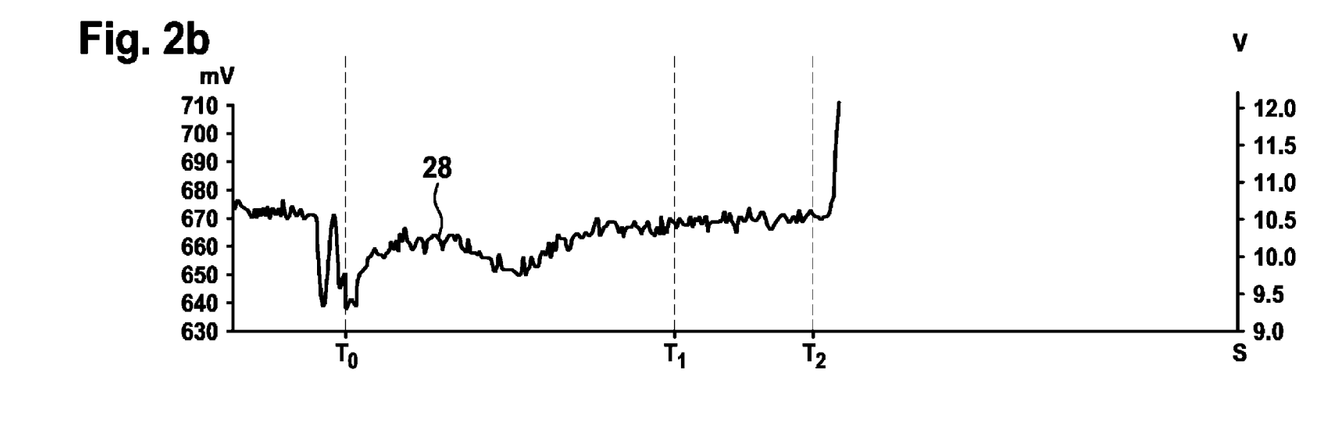

FIG. 2b shows the sensor signal 28 recorded by the pivot angle sensor 26.

At a time T₀, a motor driving the drive shaft 4 is started, and in this way the speed 44 of the drive shaft 4 increases from 0 rpm to approximately 950 rpm over the entire recorded time period that is shown in the diagram. If the motor is started at time T₀, the axial piston machine 2 begins to convey volume, and the actual output pressure 32 in the pressure line 16 begins to rise. The actual output pressure 32 does not rise linearly, but periodically, since, at low revolutions of the drive shaft 4, the piston frequency is visible when the actual output pressure 32 rises. This means that a piston stroke of the axial piston machine 2 generates a corresponding pressure increase of the actual output pressure 32. Furthermore, the pivot angle 46 captured by the control means 12, which is determined before calibration, is 100%. The pivot angle 46 can correspond, for example, to a nominal value of production. That is to say, the measured values shown here can be recorded, for example, during an initial calibration, and the pivot angle 46 can be a pre-specified value which is not determined during a calibration, but which has been pre-specified during production. An initial calibration can take place when a propulsion or working machine is started up for the first time. The calibration is started at time $T_1$. This is defined by the actual output pressure 32, which is captured by the pressure sensor 30, that reaches 20 bar, since it can be assumed that the axial piston machine 2 can be controlled at this point in time via the control means 12, which controls the proportional valve 6. That is to say, at time $T_1$, it can be assumed that the pivot angle is 100%. It can be seen that the pivot angle 48 calibrated by the control means 12 is somewhat smaller at the start of calibration at time $T_1$ than the pivot angle 46 determined by the control means 12 before calibration. Calibration is finished at time $T_2$. At time $T_2$, the actuator 8 of the proportional valve 6 is controlled via the control means 12 in such a way that a pivot angle of the axial piston machine 2 becomes smaller, so that the motor that drives the drive shaft 4 does not overload. Since, during calibration, the axial piston machine 2 conveys with a maximum pivot angle against a closed main control valve or a closed valve block, the actual output pressure 32 can increase quickly and markedly, so that the motor can no longer rotate the drive shaft 4.

For this reason, it is advantageous if the time period, i.e., the time from $T_1$ to $T_2$, is only very short. For example, a time period of $T_1$ to $T_2$ can be 80-140 milliseconds, wherein the pivot angle sensor 26 can record approximately one value per millisecond, for example. The sensor signal recorded by the pivot angle sensor 26 is shown in FIG. 2b. From $T_1$ to $T_2$, the sensor signal 28 is virtually constant, wherein sensor values fluctuate within a range of approximately 665 to 675 mV. In order to compensate for this fluctuation, the sensor values of the sensor signal 28, which are recorded in the time period from $T_1$ to $T_2$, can preferably be averaged. Furthermore, it can be seen in FIG. 2b that the sensor signal 28 may fluctuate within the range from $T_0$ to $T_1$, since the control pressure is still not present in this time period, and therefore the pivoting cradle of the hydraulic machine can also fluctuate slightly. Furthermore, in the time period from $T_0$ to $T_1$, it is possible that drops in the voltage supply of the control means can occur—in particular, severe drops. For the reasons mentioned above, it is possible that, during an initial phase of ignition, which takes place at time $T_0$, the sensor signal cannot be reliably evaluated. It is therefore advantageous to start the calibration at $T_1$. It can also be seen from FIGS. 2a and 2b that the sensor signal 28 behaves inversely proportionally to the pivot angle 46, 48. This means that the larger the sensor signal 28, the smaller the pivot angle 46, 48 assigned by the control means 12.

Figure 3A:
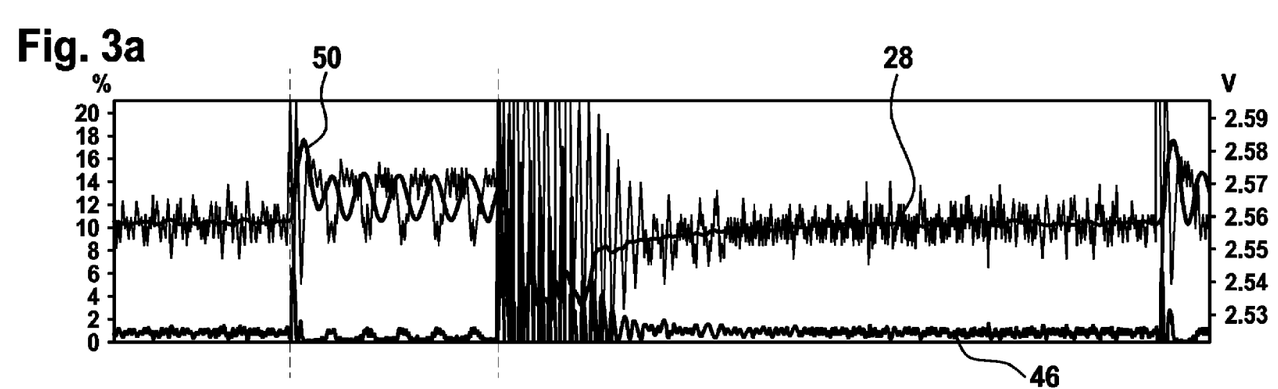
Figure 3B:
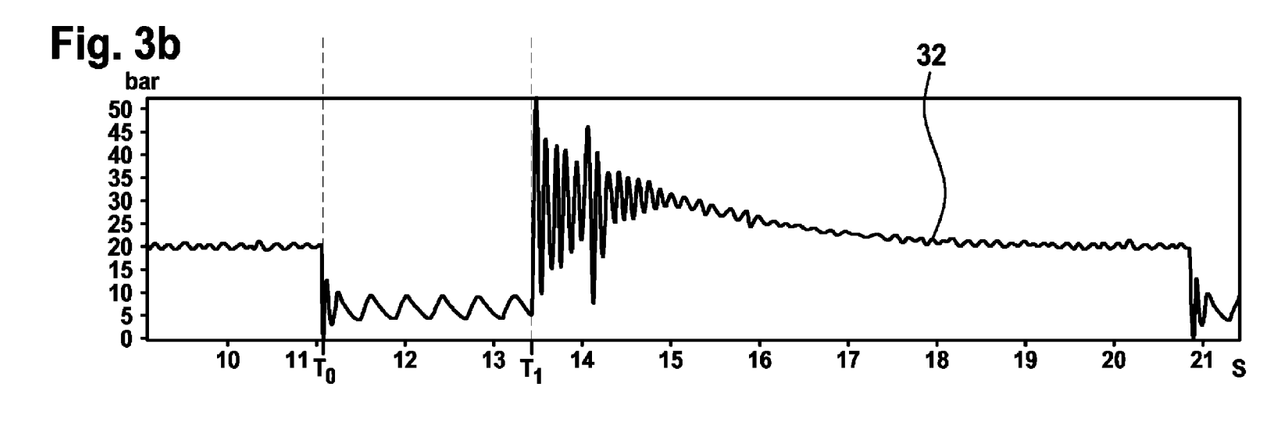

FIG. 3a shows various measured values during the calibration of the pivot angle sensor 26, wherein a sensor value is to be captured which can be assigned to the minimum pivot angle. In this example, the minimum pivot angle is defined as the pivot angle at which an actual output pressure 32, which is shown in FIG. 1, is approximately 20 bar against a closed valve—for example, the closed main control valve or the closed valve block. The actual output pressure 32 should be approximately 20 bar against a closed valve, so that an internal leakage can be compensated for, and a control pressure in the pressure line 16 (see FIG. 1) can be maintained. This value is a reference value, which provides sufficient accuracy for calibrating the pivot angle sensor. In FIG. 3a, the sensor signal 28, which is captured by the pivot angle sensor 26 of FIG. 1, is recorded. Since this signal fluctuates very strongly, a filtered sensor signal 50 is also determined and is shown in FIG. 3a by comparison. Furthermore, the pivot angle 46 determined from the sensor signal 28 by the control means 12 (see FIG. 1) is plotted. In FIG. 3b, the actual output pressure 32 is plotted over time.

It can be seen in FIG. 3a that, when the actual output pressure 32 at the beginning of the measurement up to a time To is 20 bar, the filtered sensor signal 50 (see FIG. 3a) is essentially constant and does not oscillate strongly. The pivot angle sensor 46 determined in the time period is approximately 1%. At time To, the actuator 8 of the proportional valve 6 is controlled via the control means 12 such that the pivot angle of the pump becomes smaller, and thus the actual output pressure 32, which is applied to the pressure line 16, lies within the range of 5 to 10 bar. In this period from $T_0$ to $T_1$, the actual output pressure 32 oscillates between 5 to 10 bar, and the sensor signal 28, and thus even the filtered sensor signal 50 (see FIG. 3a), fluctuates more strongly up to time To compared with the sensor signal 28 and the filtered sensor signal 50. For this reason, the pivot angle 46 shown in FIG. 3a also varies within a range of 0% to 2%. Since this fluctuation is very strong, it is difficult to carry out the calibration. If the axial piston machine 2 is controlled via the control means 12 in such a way that the pivot angle is very small, the detected sensor value 28 will fluctuate, and therefore this state will not be suitable for calibration. It is therefore advantageous if the calibration is carried out when the actual output pressure is adjusted to approximately 20 bar. Subsequent to time $T_1$, the proportional valve 6 is controlled via the control means 12 in such a way that the actual output pressure 32 is re-adjusted to approximately 20 bar. As is also shown in the time period up to To, the filtered sensor signal 50 is virtually constant as soon as the pressure 32 has been regulated to approximately 20 bar, and this state is therefore very well-suited for a calibration.

LIST OF REFERENCE SIGNS

1 Hydraulic pressure-medium supply arrangement
2 Axial piston machine
4 Drive shaft
6 Proportional valve
8 Actuator
10 Control variable
12 Control means
14 Spring
16 Pressure line
18 Control line
19 Tank line
20 Control chamber
22 Actuating cylinder
24 Actuating piston
26 Pivot angle sensor
28 Sensor signal
30 Pressure sensor
32 Actual output pressure
34 Cylinder
36 Actuating piston
38 Control chamber
40 Spring
42 Working machine
44 Motor speed
46 Pivot angle
48 Calibrated pivot angle
50 Filtered sensor signal

The invention claimed is:

1. A method for calibrating a pivot angle sensor of a hydraulic machine of a propulsion or working machine, comprising:
controlling the hydraulic machine with a control device to adjust a pivot angle of the hydraulic machine to a maximum pivot angle;
processing a sensor signal of the pivot angle sensor with the control device when the pivot angle of the hydraulic machine is at the maximum pivot angle;
calibrating the pivot angle sensor with the control device based on the processed sensor signal; and
operating the hydraulic machine to control a delivery flow of a fluid from the hydraulic machine and/or a delivery volume of the fluid from the hydraulic machine using the calibrated pivot angle sensor.

2. The method according to claim 1, wherein the control device performs the calibrating of the pivot angle sensor during a start-up of the propulsion or working machine.

3. The method according to claim 1, wherein the control device calibrates the pivot angle sensor based on characteristic, pre-specified, and/or intended operating states of the propulsion or working machine.

4. The method according to claim 1, wherein the hydraulic machine is installed as intended in or on the propulsion or working machine during the calibrating.

5. The method according to claim 1, wherein:
the sensor signal is a first sensor signal having a first sensor value,
the method further includes (i) controlling the hydraulic machine with the control device so that the pivot angle of the hydraulic machine is at a different pivot angle, (ii) processing a second sensor signal of the pivot angle sensor with the control device when the pivot angle of the hydraulic machine is at the different pivot angle,
the second sensor signal has a second sensor value, and
the control device forms a respective pair of values from the first sensor value and the second sensor value that is used to calibrate the pivot angle sensor.

6. The method according to claim 5, wherein, before the calibrating, the control device assigns to a respective pivot angle a respective nominal value or a respective sensor value determined in a previous calibration of the pivot angle sensor.

7. A method for calibrating a pivot angle sensor of a hydraulic machine of a propulsion or working machine, comprising:
controlling the hydraulic machine with a control device to adjust a pivot angle of the hydraulic machine;
processing a pivot-angle-dependent sensor signal of the pivot angle sensor with the control device, the pivot-angle-dependent sensor signal including a sensor value;
calibrating the pivot angle sensor with the control device by (i) controlling a state of the hydraulic machine with the control device, the state of the hydraulic machine defined by a design-related pressure or a design-related pressure-medium volume flow of the hydraulic machine, (ii) receiving the pivot-angle-dependent sensor signal and detecting a corresponding sensor value, and (iii) assigning the detected corresponding sensor value to a minimum pivot angle of the hydraulic machine with the control device; and operating the hydraulic machine to control a delivery flow of a fluid from the hydraulic machine and/or a delivery volume of the fluid from the hydraulic machine using the calibrated pivot angle sensor, wherein the design-related pressure or the design-related pressure-medium volume flow characterizes an internal leakage of the hydraulic machine.

8. The method according to claim 7, wherein:

the sensor value and the pivot angle of the hydraulic machine form a value pair, and calibrating the pivot angle sensor comprises:
controlling at least two states of the hydraulic machine with the control device, so that at least two value pairs are formed by the control device, and further value pairs are interpolated or extrapolated, and/or controlling the at least two states with the control device and determining further value pairs via a calculation rule.

9. The method according to claim 8, further comprising:

controlling the state with the control device over a pre-specified period of time and averaging sensor values of the pivot-angle-dependent sensor signal captured in the pre-specified period of time so that an averaged sensor value is determined; and forming at least one of the value pairs with the averaged sensor value using the control device.

10. The method according to claim 8, further comprising:

forming at least one of the value pairs, using the control device, with the sensor value captured when the control device controls the state, when the sensor value is within a predetermined interval.

11. A control device for a hydraulic machine of a propulsion or working machine, comprising:

a pivot angle sensor for the hydraulic machine, wherein the hydraulic machine is controlled with the control device to adjust a pivot angle of the hydraulic machine to a maximum pivot angle, and a sensor signal of the pivot angle sensor is processed by the control device when the pivot angle of the hydraulic machine is at the maximum pivot angle, wherein the control device is configured to calibrate the pivot angle sensor based on the processed sensor signal, and wherein the control device is further configured to operate the hydraulic machine to control a delivery flow of a fluid from the hydraulic machine and/or a delivery volume of the fluid from the hydraulic machine using the calibrated pivot angle sensor.

12. The control device according to claim 11, further comprising:

a proportional valve, wherein to adjust the pivot angle, the control device is configured to actuate the proportional valve, and wherein a control chamber of an actuating cylinder of the hydraulic machine is acted upon with pressure medium based on a position of the proportional valve, wherein an actuating piston of the actuating cylinder is subjected to the pressure medium via the control chamber, and wherein the pivot angle of the hydraulic machine is changed via the actuating piston.

13. The control device according to claim 11, wherein the control device is included in a propulsion or working machine.

* * * * *